(12) United States Patent
Ovesen et al.

(10) Patent No.: US 12,109,554 B2
(45) Date of Patent: Oct. 8, 2024

(54) SHELL IMPREGNATED CATALYST AND PROCESS FOR PRODUCING A SHELL IMPREGNATED CATALYST BODY

(71) Applicant: Haldor Topsoe A/S, Kgs. Lyngby (DK)

(72) Inventors: Charlotte Vinding Ovesen, Virum (DK); Fernando Morales Cano, Copenhagen (DK); Jens Henrik Hyldtoft, Skibby (DK); Michael Brorson, Holte (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 0 days.

(21) Appl. No.: 16/193,838

(22) Filed: Nov. 16, 2018

(65) Prior Publication Data

US 2019/0091665 A1    Mar. 28, 2019

Related U.S. Application Data

(62) Division of application No. 15/129,469, filed as application No. PCT/EP2015/057493 on Apr. 7, 2015, now abandoned.

(30) Foreign Application Priority Data

Apr. 7, 2014    (DK) .................................. 2014 00196

(51) Int. Cl.
*B01J 23/58* (2006.01)
*B01J 23/00* (2006.01)
(Continued)

(52) U.S. Cl.
CPC ............. *B01J 23/78* (2013.01); *B01J 23/005* (2013.01); *B01J 23/58* (2013.01); *B01J 35/19* (2024.01);
(Continued)

(58) Field of Classification Search
CPC .... B01J 37/0203; B01J 37/0205; B01J 37/08; B01J 23/005; B01J 23/78
See application file for complete search history.

(56) References Cited

U.S. PATENT DOCUMENTS

| 2004/0067848 A1 | 4/2004 | Wakatsuki et al. |
| 2004/0192792 A1* | 9/2004 | Espinoza ................. B01J 23/63 |
| | | 518/716 |

(Continued)

FOREIGN PATENT DOCUMENTS

| CN | 101279271 A | 10/2008 |
| EP | 1013603 A1 * | 6/2000 ............ B01J 35/002 |

(Continued)

OTHER PUBLICATIONS

Machine translation of Fukunaga et al (JP2004230312A), publication date Aug. 19, 2004.*

(Continued)

*Primary Examiner* — Jun Li
(74) *Attorney, Agent, or Firm* — Boone IP Law

(57) ABSTRACT

A process for producing a catalyst, comprising the steps of modifying a carrier by a first impregnation with at least one alkaline earth metal in a first metal precursor solution, the first metal precursor being decomposed to form at least one metal oxide or metal hydroxide, thereby obtaining a modified carrier. A second impregnation is carried out by incipient wetness by a second precursor solution comprising at least one metal Me in a second solution. Finally, the second precursor is decomposed, thereby obtaining a catalyst body having an enrichment of the at least one metal Me in the outer shell of the catalyst body, the metal being present in a concentration having either as an egg-shell profile or a hammock profile.

21 Claims, 7 Drawing Sheets

(51) Int. Cl.
| | |
|---|---|
| B01J 23/78 | (2006.01) |
| B01J 35/00 | (2006.01) |
| B01J 35/08 | (2006.01) |
| B01J 35/10 | (2006.01) |
| B01J 35/30 | (2024.01) |
| B01J 35/51 | (2024.01) |
| B01J 35/61 | (2024.01) |
| B01J 35/63 | (2024.01) |
| B01J 37/02 | (2006.01) |
| C01B 3/40 | (2006.01) |

(52) U.S. Cl.
CPC ............ *B01J 35/397* (2024.01); *B01J 35/51* (2024.01); *B01J 35/612* (2024.01); *B01J 35/613* (2024.01); *B01J 35/633* (2024.01); *B01J 35/635* (2024.01); *B01J 37/0201* (2013.01); *B01J 37/0203* (2013.01); *B01J 37/0205* (2013.01); *C01B 3/40* (2013.01); *C01B 2203/0233* (2013.01); *C01B 2203/0244* (2013.01); *C01B 2203/0261* (2013.01); *C01B 2203/1058* (2013.01); *C01B 2203/1064* (2013.01); *C01B 2203/1241* (2013.01); *Y02P 20/52* (2015.11)

(56) References Cited

U.S. PATENT DOCUMENTS

| | | |
|---|---|---|
| 2008/0003288 A1 | 1/2008 | Bromberg et al. |
| 2008/0032887 A1* | 2/2008 | Ratnasamy .............. B01J 23/58 502/335 |
| 2009/0111687 A1 | 4/2009 | Gabriel |
| 2010/0167919 A1* | 7/2010 | Lee ........................ B01J 35/002 502/324 |
| 2011/0038775 A1* | 2/2011 | Takahashi .............. B01J 21/005 423/245.1 |
| 2012/0135860 A1* | 5/2012 | Carlsson ................... C01B 3/38 502/306 |
| 2012/0329645 A1 | 12/2012 | Skjoth-Rasmussen |
| 2013/0053237 A1* | 2/2013 | Xu ..................... H01M 8/0618 502/328 |
| 2013/0281289 A1* | 10/2013 | Forrest ................... B01J 23/005 502/328 |
| 2014/0255695 A1* | 9/2014 | D'Souza ................ B01J 21/005 428/402 |
| 2015/0231608 A1* | 8/2015 | Jacobsen ................ B01J 35/002 502/328 |

FOREIGN PATENT DOCUMENTS

| | | |
|---|---|---|
| EP | 2 208 529 A2 | 7/2010 |
| JP | 2004230312 A * | 8/2004 |
| WO | WO 2004/011138 A1 | 2/2004 |
| WO | 2010/125369 A2 | 11/2010 |
| WO | WO 2012/056211 A1 | 5/2012 |

OTHER PUBLICATIONS

Y. Weng, "Industrial Petrology", Oct. 30, 1990, p. 98.
Y. Qiu, "Study on Nickel-based Catalysts for Partial Oxidation of Methane to Synthesis Gas," China Doctoral Dissertations, pp. 88-89, Apr. 2009.
G. Xiao et al., "The Role of Hydrogen in Low Carbon Economy," Wuhan University of Technology Press, p. 26, Jun. 30, 2011.
"Catalyst Handbook for Synthesizing Ammonia," Nanjing Research Institute of Chemical Industries, Petrochemical Industry Press, p. 88, Sep. 30, 1977.
N. Laosiripojana et al., "Effect of high surface area $CeO_2$ and Ce-$ZrO_2$ supports over Ni catalyst on $CH_4$ reforming with $H_2O$ in the presence of $O_2$, $H_2$, and $CO_2$", *Chemical Engineering Journal* 138 (2008) pp. 264-273.
F. Zhang et al., "Phases in Ceria-Zirconia Binary Oxide (1-x)$CeO_2$-x$ZrO_2$ Nanoparticles: The Effect of Particle Size", *J. Am. Ceram. Soc.*, 89 [3] 1028-1036 (2006).
Brief Communication, Opposition, issued by the European Patent Office on Jan. 13, 2022, in European Patent Application EP 15716758. 6, (Haldor Topsoe A/S), (50 pages).
Summons to Attend Oral Proceedings/Transmittal of Decision, Opposition, issued by the European Patent Office on Jan. 13, 2022, in European Patent Application EP 15716758.6, (Haldor Topsoe A/S), (10 pages).
Notification of Opposition issued by the European Patent Office on Aug. 16, 2021 in European Patent Application EP 15716758.6, (Haldor Topsoe A/S), (19 pages).

* cited by examiner

SHELL IMPREGNATED CATALYST AND PROCESS FOR PRODUCING A SHELL IMPREGNATED CATALYST BODY

This is a divisional of application Ser. No. 15/129,469, filed Sep. 27, 2016, which is a 371 of International Application No. PCT/EP2015/057493, filed Apr. 7, 2015, which claims priority to Denmark Application No. PA 2014 00196, filed Apr. 7, 2014, the contents of which are incorporated herein by reference in their entireties.

The invention relates to a catalyst and a process for producing a catalyst for syngas generation.

New catalysts are under constant development as the requirements for efficiency, lifetime and also costs of the catalyst are ever increasing.

For various reasons it may be beneficial to reduce the amount of metals in the catalyst, for example it may be relevant to minimize the amount of the metal in the catalyst due to environmental considerations. In catalysts for reactions limited by mass transfer such as steam reforming reactions or catalytic partial oxidation at high temperatures the reactive metal is only needed in the surface zone of a catalyst body, i.e. in such catalyst bodies it may be relevant to have a significant metal concentration in the surface zone only. This surface concentrated metal layer also limits unwanted side reactions such as ammonia production in steam reforming of nitrogen rich feedstocks.

On the other hand, however, the requirements to the structural stability and lifetime of the catalyst are high as it is critical for loading and running the reactors with the catalyst. Due to these requirements to strength of the carrier, the carrier for e.g. steam reforming catalysts is most often sintered at high temperatures, which reduces the reactivity of the carrier rendering e.g. shell impregnation difficult by known means.

Thus there is a need for development of new processes for making shell enriched catalysts based on even highly inert carriers.

SUMMARY OF THE INVENTION

In a first aspect of the present process is provided a process which limits the consumption of active metal, In a second aspect of the present process is provided a process which maintains the strength of the carrier, In a second third aspect of the present process is provided a process which can be carried out on industrial scale, These and other advantages are obtained by a process for producing a catalyst, said process comprising the steps of:
providing a carrier
modifying said carrier by a first impregnation with at least one alkaline earth metal in a first metal precursor solution
in a first decomposition, decomposing the first metal precursor to form at least one alkaline earth metal oxide or hydroxide thereby obtaining a modified carrier
carrying out a second impregnation preferably by incipient wetness by a precursor comprising at least one metal Me in a second solution
in a second decomposition decomposing the precursor thereby obtaining a catalyst having an enrichment of the at least one metal Me in the outer shell of the catalyst body, said at least one metal being present in a concentration having either an egg-shell profile or a hammock profile Thus according to the present method the carriers are first modified by impregnation by incipient wetness with a solution of a first substance e.g. one or more alkaline earth metals in a metal precursor solution followed by decomposition of the precursor to form an oxide or hydroxide layer on the carrier.

The hereby deposited oxide/hydroxide layer renders the carrier basic and increases the surface reactivity. The increased surface reactivity increases the reactivity towards the second metal Me applied in the second impregnation.

The second impregnation is performed by incipient wetness using a solution of a metal precursor. The decomposition of the precursor to metal oxide may be performed. The increase in surface reactivity obtained by modifying the carrier with an alkaline earth metal thereby results in an enrichment of metal Me in the outer shell of the catalyst body either as an egg-shell profile and/or as a hammock profile.

The first and/or the second impregnation may be repeated one or more times in order to achieve a desired metal concentration. For example impregnation with Ni may be carried out two, three or more times in order to achieve an optimal Ni concentration in the formed shell. The repeated first and/second impregnation may be carried out with or without a following intermediate calcination.

In the present context egg-shell profile means that the metal is present in a layer in the surface region of the catalyst body. With an egg-shell profile the metal concentration decreases to zero or substantially zero in the centre region of the catalyst body. The layer comprising the metal is preferably below 1000 μm, such as below 500 μm.

In the present context hammock profile means that the metal is mainly present in a layer in the surface region of the catalyst tablet with a metal concentration which becomes lower but not zero in the centre region of the catalyst body.

The necessary or preferred shell thickness depends on the specific application. The higher the mass transfer limited reaction is, the thinner the shell can be. Thus for instance catalysts for application in secondary reformers may have a thinner shell than catalysts for application in primary reformers.

In catalysts to be used at temperatures such as 1000-1200° C. a thin shell (e.g. less than 200 μm) impregnation may be sufficient as the reaction is severely mass transfer restricted.

In catalysts to be used at temperatures such as 700-1000° C. a thicker shell (e.g. less than 400 μm) impregnation may be preferred as the reaction is less mass transfer restricted.

The metal-profile of the catalyst body is determined by the application of scanning electron microscopy analysis (SEM) using standardless Energy Dispersive X-ray Spectroscopy (EDS)-analysis for chemical composition. The shell thickness is defined as the distance from the outer surface of the catalyst body to the position where the metal concentration is 150% of the average metal concentration, as calculated as the average concentration from 800 μm and to the centre of the catalyst body. The metal concentration in the shell is calculated as the average of the measured metal concentrations in the shell.

The pore volume, porosity and BET surface area is relevant for the results of the impregnation. Preferably the carrier has a pore volume 200-400 ml/kg and/or BET surface area 2.0-50 $m^2/g$, such as 2-25 $m^2/g$.

The BET surface area is determined by single point BET-analysis. The sample is placed in a U-tube and dried at 300° C. in a flow of helium for 8 hours. Hereafter the U-tube with the sample is cooled in a bath of liquid nitrogen and nitrogen is adsorbed on the sample by exposing the sample to a flow with 30% nitrogen in helium. The nitrogen concentration in the exit gas from the U-tube containing the sample is determined with a TCD (Thermal Conductivity Detector). When adsorption has come to an equilibrium the cooling bath is removed and a desorption peak is recorded and integrated. The BET surface area is obtained from the amount of nitrogen desorbed from the sample.

Thereby by the application of the present process it is possible to control the distribution of the metal Me in the catalyst body. I.e. by the present method is provided a catalyst wherein the active metal is only or at least predominantly found in the areas of the catalyst tablet where the reaction such as steam reforming reaction is kinetically controlled during the catalytic process. This means that the active metal is not or in very limited amount found in the centre of the carrier i.e. the metal is not or only in limited amount present in areas of the catalyst body where the reaction is thermodynamically controlled/in equilibrium.

By limiting the metal to the shell of the catalyst body secondary reactions such as ammonia formation are also limited.

Preferred carriers may be alumina spinel such as magnesium alumina spinel, calcium aluminate (such as $CaAl_{12}O_{19}$, $CaAl_4O_7$), zirconia, various alumina such as α- or γ-$Al_2O_3$ and/or combinations thereof. Preferred are calcium aluminate and/or magnesium alumina spinel as these can provide a final catalyst body with a high strength and which is able to withstand high temperatures and/or high steam pressures of the reforming processes. As mentioned above the first substance applied by the first precursor solution may be an alkaline earth metal such as Mg, Ca, Sr, and/or Ba.

By the present invention, it is possible to create a metal enriched shell on a relatively inert carrier material. Carriers used for steam reforming are most often sintered at high temperatures in order to provide a sufficient strength of the carrier to withstand the high temperatures and high steam pressures. However the carrier is not only made stronger by sintering but also made less reactive rendering the task of creating a metal shell non trivial. Carriers for steam reforming may comprise magnesium alumina spinel or Ca-aluminates as they provide high thermal stability, high tablet strength and sufficient surface area after sintering at very high temperatures. Other typical carriers such as γ-$Al_2O_3$ or other transition aluminas provide high catalytic surface area but may not be stable under conditions of high temperature and high steam pressures. γ-$Al_2O_3$ also require high sintering temperatures in order to render high tablet strength and good thermal stability under relevant steam reforming conditions and consequently, upon high temperature treatments, the γ-$Al_2O_3$ readily transforms into α-$Al_2O_3$, which in turn has a very low surface area and is not suitable for some steam reforming applications. Furthermore, magnesium alumina spinel or Ca-aluminates carriers are more basic than alumina-based carriers, thus allowing operation at low steam/carbon ratios without risk of carbon deposition in the catalyst bed, which would significantly decrease the catalyst lifetime. In other worlds, under relevant steam reforming conditions it might be preferred to use magnesium alumina spinel or Ca-aluminates carriers in order to ensure C-free operation. In conclusion, magnesium alumina spinel or Ca-aluminates carriers or combinations hereof are preferred over alumina carriers for certain steam reforming applications.

Preferably the carrier comprises 50-99% $MgAl_2O_4$ and/or Ca Aluminate, such as at least 80% $MgAl_2O_4$ and/or Ca Aluminate. E.g. the carrier comprises at least 90% $MgAl_2O_4$ and/or Ca Aluminate, such as at least 90% $MgAl_2O_4$ or at least 90% Ca Aluminate. The calcium aluminate may be in the form of hibonite ($CaAl_{12}O_{19}$), grossite ($CaAl_4O_7$) or calcium monoaluminate ($CaAl_2O_4$), or a combination thereof.

Alkaline earth metals may be chosen as they increase the reactivity of the carrier against the metal precursor.

In some embodiments, the alkaline earth metal oxide/hydroxide concentration is 0.5-10 wt % after impregnation. Preferably 1-6 wt %. E.g. 1.5-5 wt %. The applicant has shown that e.g. 1.5 wt % MgO results in a clear shell formation. Similarly the applicant has shown that 1.5 wt % CaO results in an increased Me concentration in the shell region and that 3 wt % CaO results in a clear shell formation.

The first decomposition is preferably carried out at a temperature from 300-900° C., such as 350-700° C., and/or 400-600° C.

The first decomposition temperature may be selected depending on the first precursor solution. For example nitrates may decompose in the range of 350-600° C.

The first decomposition may be carried out in various atmospheres including but not limited to air, $H_2$, $N_2$ and/or other inerts or reducing gases. The decomposition time may be varied depending on e.g. the first precursor solution, decomposition temperature and/or decomposition atmosphere.

The second metal precursor may for example be Me-nitrate, Me-acetate as well as complexes such as Me-citrate, Me-Ethylenediaminetetraacetic acid (EDTA) or Me-Ethylenediamine (EDA). The metal precursor may be selected to induce a desired reactivity between the metal precursor and the modified carrier surface.

The impregnated carrier can optionally be dried between the second impregnation and the second decomposition as this under some conditions may assist the formation of the shell impregnation.

The drying step may be carried out in air at for example at temperatures 80-150° C.

The second decomposition is preferably carried out at a temperature from 250-600° C., for example 300 or 450° C.

The second decomposition may be carried out in air, $H_2$, $N_2$ or other atmosphere preferably for 0.5-5 hours, such as 1-4 hours.

The second decomposition may depending on applied decomposition atmosphere decompose the specific metal precursor into a metal oxide, a metal or a combination hereof.

E.g. the metal may be present as NiO or $Rh_2O_3$ after decomposition in air. If reduced and/or during operation under reforming conditions the metals may be present at least partly in reduced form as Ni, Rh, Ru etc.

The resulting catalyst body may preferably be used in steam reforming, primary and/or secondary reforming and/or in catalytic partial oxidation of methane.

The formed catalyst has a core section and a shell section. The core section comprises the carrier material impregnated with the alkali earth metal oxide or hydroxide. The shell section comprises the carrier material impregnated with the alkali earth metal oxide or hydroxide as well as the metal Me.

The thickness of the shell section may vary but may for example be from 5-1000, such as 10-800 μm or 30-700 μm or below 500 μm but above 5 μm.

The shell thickness are calculated as the distance from the outer surface of the catalyst body to the position where the metal concentration is 150% of the average metal concentration, as calculated as the average concentration from 800 μm and to the centre of the catalyst body.

In other words the shell thickness may be defined as the distance from the outer surface of the catalyst to the points where the metal Me concentration is 150% of the average of the Me concentration in the centre core section.

Where the average concentration in the centre section is at or below the minimum measurement threshold approximately 0.5 wt % (by EDS) the shell may be defined as to start where the metal concentration is 1.5 times 0.5 wt %.

In many embodiments it may be desired that the majority of the metal Me is found in a relatively small part of the catalyst. For example at least 90% of the metal Me such as Ni, Ru and/or Rh is found in the shell (e.g. within an outer layer of up to 500 μm) as measured by EDS or WDS.

The relative shell thickness may vary but in several embodiments the shell thickness is 50% or less of the catalyst radius (average distance from centre to outer surface), such as less than 30% or less than 20% or less than 10% of the radius.

A preferred catalyst may comprise a core section and a shell section, wherein
- the carrier is magnesium alumina spinel and/or calcium aluminates and/or where the alkaline earth metal oxide and/or alkaline earth metal hydroxide is MgO, Mg(OH)$_2$, CaO and/or Ca(OH)$_2$, and
- the shell section comprises magnesium alumina spinel and/or calcium aluminates and MgO, Mg(OH)$_2$, CaO and/or Ca(OH)$_2$ and at least one metal Me.

Depending on the intended use, the metal Me is Ni, Ru and/or Rh.

The concentration of alkaline earth metal oxide and/or alkaline earth metal hydroxide such as MgO, Mg(OH)$_2$, CaO and/or Ca(OH)$_2$ in the core section is 0.5-10 wt %, such as 1-5 wt %. The concentration of alkaline earth metal oxide and/or alkaline earth metal hydroxide may be varied in order to achieve a desired shell thickness. For example 2, 3, 4, 5, 6 wt % may result in a sharp a relatively narrow shell which may be desirable e.g. if the catalyst is to be used at high reaction temperatures such as 700-1400° C.

The average concentration of Me in the shell may in some embodiments be <20 wt %, <15 wt % such as 1-15 wt %, <10 wt % such as 0.75-10 wt % or 1.5-10 wt %.

In catalyst according to the present application the Me concentration is lower in the center than in the shell. For example the average Me concentration in the center region may be 50% or less (such as 33% or less, 25% or less or 10% or less) of the average Me concentration in the shell.

Preferably the Me concentration is <5 wt % or in some cases more preferably <2 wt % in the center. In some embodiments the Me concentration is substantially 0 wt % in the center of the catalyst.

The catalyst may be a cylinder, sphere, elongated hexagonal etc. Various tablet shapes and sizes may be used for the catalyst according to the present application.

The catalyst may have a massive body or a body with one or more indentation and/or through-going holes.

The catalyst may in various embodiments have a diameter (or average cross section if not circular) of 3-100 mm, preferably 5-50 mm, such as 10-35 mm which is relevant for many industrial catalysts.

Thus, according to the present method is provided a catalyst, e.g. a steam reforming catalyst, which is very strong and thereby able to survive under the often very harsh conditions present in catalytic processes. For example under steam reforming, in steam reformers where very high temperatures and high water partial pressures are applied.

Thus an advantage of the new synthesis method is that by impregnating the carrier with an alkaline-earth metal the carriers basicity and/or reactivity is increased without changing the strength or the structural integrity of the catalyst body. This changes the carriers affinity for reaction with a particular metal-precursor on a subsequent second impregnation. Thereby by the application of the present process it is possible to control the metal e.g. Ni-distribution in the catalyst body.

EXAMPLES AND DETAILED DESCRIPTION OF THE INVENTION

In the below various examples are provided. The examples are to be regarded as exemplary in order to illustrate and elaborate on steps of the method and catalyst body product. The examples are not to be construed as limiting to the invention.

Example I

Carrier:

A magnesium alumina spinel carrier containing 92 wt % MgAl$_2$O$_4$ and 8 wt % Al$_2$O$_3$ with a pore volume of 260 ml/kg, a porosity of 46% and a BET surface area of 20 m2/g.

Impregnation of the carrier with an alkaline earth metal: The carrier is impregnated by incipient wetness with a Ca(NO$_3$)$_2$ solution at room temperature for half an hour to obtain 3 wt % CaO on the carrier. After impregnation the calcium nitrate is decomposed at 550° C.

Impregnation of the modified carrier with a nickel metal precursor:

The carrier is impregnated by incipient wetness at room temperature with a nickel nitrate solution containing 7 wt % Ni. After impregnation the nickel nitrate is decomposed at 450° C.

Example II

Carrier: A carrier as described in example I is used.

Impregnation of the carrier with an alkaline earth metal: The carrier is impregnated by incipient wetness at room temperature with a Ca(NO$_3$)$_2$ solution as described in example I, Carrier.

Impregnation of the modified carrier with a nickel metal precursor:

The carrier is impregnated by incipient wetness at room temperature with a 0.6 M (M stands for molar concentration and this abbreviate is used throughout the document) nickel acetate solution. After impregnation the nickel acetate is decomposed at 450° C.

Example III

Carrier: A carrier as described in example I is used.

Impregnation of the carrier with an alkaline earth metal: The carrier is impregnated by incipient wetness with a Ca(NO$_3$)$_2$ solution as described in example I carrier Impregnation of the modified carrier with a nickel metal precursor:

The carrier is impregnated by incipient wetness at 80° C. with a nickel citrate solution containing 9 wt % Ni. The solution was prepared by dissolving 7.6 g nickelhydroxycarbonate containing 42% Ni and 11.4 g citric acid in 15 ml water at 80° C. After impregnation the nickel citrate is decomposed at 450° C.

Example IV

Carrier: A carrier as described in example I is used.
Impregnation of the carrier with an alkaline earth metal:
The carrier is impregnated by incipient wetness with a Mg(NO$_3$)$_2$ solution to obtain 3 wt % MgO on the carrier. After impregnation the magnesium nitrate is decomposed at 350° C.
Impregnation of the modified carrier with a nickel metal precursor:
The carrier is impregnated by incipient wetness with a nickel citrate solution as described in example III. After impregnation the nickel citrate is decomposed at 450° C.

Example V

Carrier: A carrier as described in example I is used.
Impregnation of the carrier with an alkaline earth metal:
The carrier is impregnated by incipient wetness with a Mg(NO$_3$)$_2$ solution as described in example IV.
Impregnation of the modified carrier with a nickel metal precursor:
The carrier is impregnated by incipient wetness at 40° C. for half an hour with a 1.2 M nickel EDTA solution. The Ni-EDTA solution is prepared by dissolving 11.2 g EDTA in 30 ml concentrated ammonia solution at 40° C. and adding 11.2 g nickel nitrate. After impregnation the nickel EDTA is decomposed at 450° C.

Example VI

Carrier:
A calciumaluminate carrier containing 53 wt % CaAl$_4$O$_7$, 33 wt % CaAl$_{12}$O$_{19}$, 13 wt % Al$_2$O$_3$ and 1 wt % MgAl$_2$O$_4$ with a pore volume of 280 ml/kg, a porosity of 46% and a BET surface area of 2 m$^2$/g.
Impregnation of the carrier with an alkaline earth metal:
The carrier is impregnated by incipient wetness with an Ca(NO$_3$)$_2$ solution as described in example I.
Impregnation of the modified carrier with a nickel metal precursor:
The carrier is impregnated by incipient wetness with a nickel citrate solution as described in example III. After impregnation the nickel citrate is decomposed at 450° C.

Example VII

Carrier: A carrier as described in example I is used.
Impregnation of the carrier with an alkaline earth metal:
The carrier is impregnated by incipient wetness with a Mg(NO$_3$)$_2$ solution as described in example IV.
Impregnation of the modified carrier with a nickel metal precursor:
The carrier is impregnated by incipient wetness with a nickel citrate solution as described in example III. After impregnation the nickel citrate is decomposed at 450° C.

Example VIII

Carrier: A carrier as described in example I is used.
Impregnation of the carrier with an alkaline earth metal:
The carrier is impregnated by incipient wetness with a Mg(NO$_3$)$_2$ solution as described in example IV.
Impregnation of the modified carrier with a nickel metal precursor:
The carrier is impregnated by incipient wetness at room temperature with a 0.5 M nickel ethylenediamine solution (nickel-EDA). The solution was prepared by dissolving 4.4 g of nickel-nitrate in 30 ml demineralized water and adding 1.8 g of ethylenediamine. After impregnation the nickel EDA is decomposed at 450° C.

Example IX

Carrier: A carrier as described in example I is used.
Impregnation of the carrier with an alkaline earth metal:
The carrier is impregnated by incipient wetness with a Mg(NO$_3$)$_2$ solution as described in example IV.
Impregnation of the carrier with a Ru metal precursor:
The carrier is impregnated by incipient wetness with a solution of rutheniumnitrosylnitrate to obtain 0.5 wt % Ru on the carrier. The impregnation liquor was prepared by diluting with water a commercial available solution containing 8.2% rutheniumnitrosylnitrate. After impregnation the catalyst is dried at 80° C. for one hour.

Example X

Carrier: A carrier containing magnesium alumina spinel (MgAl$_2$O$_4$) and a-alumina with a pore volume of 406 ml/kg, a porosity of 62% and a BET surface area of 4 m$^2$/g
Impregnation of the carrier with an alkaline earth metal:
The carrier is impregnated by incipient wetness with a 3.5 M Mg(NO$_3$)$_2$ solution. Calcined for two hours at 550° C.
Impregnation of the carrier with a metal precursor solution:
Impregnation for 6 minutes by incipient wetness with a solution containing 0.26 M Rh (as Rh(NO$_3$)$_3$), 0.4 M Al (as Al(NO$_3$)$_3$) and 2.8 M Mg (as Mg(NO$_3$)$_2$), where the pH of the solution was adjusted to about 3-3.5 with aqueous ammonia. Final calcination at 750° C. for 2 hours.

Example XI

Comparative Example

Carrier: A carrier as described in example I is used.
Impregnation of the carrier with a nickel metal precursor:
The carrier is impregnated by incipient wetness at room temperature with a 0.6 M nickel acetate solution. After impregnation the nickel acetate is decomposed at 450° C. The impregnation and calcination is repeated two times.

Example XII

Comparative Example

Carrier: A carrier as described in example I is used.
Impregnation of the carrier with a nickel metal precursor:
The carrier is impregnated with a nickel citrate solution as described in example III. The impregnation and calcination was repeated one time.

Example XIII

Comparative Example

Carrier: A carrier as described in example I is used.
Impregnation of the carrier with a nickel metal precursor:
The carrier is impregnated by incipient wetness at 80° C. with a nickel nitrate solution containing 9 wt % Ni. After impregnation the nickel nitrate is decomposed at 450° C. The impregnation and calcination was repeated one time more.

Example XIV

Carrier: A carrier as described in example VI is used.
Impregnation of the carrier with a nickel metal precursor: The carrier is impregnated with a nickel citrate solution according to the procedure described in example XIII.

Example XV

Carrier: A carrier as described in example I is used.
Impregnation of the carrier with a Ru metal precursor: The carrier is impregnated according to the procedure given in example IX.

Example XVI

Carrier: A carrier as described in example I is used.
Impregnation of the carrier with an alkaline earth metal: The carrier from example I is impregnated by incipient wetness with a $Ca(NO_3)_2$ solution at room temperature for half an hour to obtain 1.5 wt % CaO on the carrier. After impregnation the calcium nitrate is decomposed at 550° C.
Impregnation of the modified carrier with a nickel metal precursor:
The carrier is impregnated by incipient wetness with a nickel citrate solution as described in example III. After impregnation the nickel citrate is decomposed at 450° C.

Example XVII

Carrier: A carrier as described in example I is used.
Impregnation of the carrier with an alkaline earth metal: The carrier from example I is impregnated by incipient wetness with a $Ca(NO_3)_2$ solution at room temperature for half an hour to obtain 5.0 wt % CaO on the carrier. After impregnation the calcium nitrate is decomposed at 550° C.
Impregnation of the modified carrier with a nickel metal precursor:
The carrier is impregnated by incipient wetness with a nickel citrate solution as described in example III. After impregnation the nickel citrate is decomposed at 450° C.

Example XVIII

Carrier: A carrier as described in example I is used.
Impregnation of the carrier with an alkaline earth metal: The carrier is impregnated by incipient wetness with a $Mg(NO_3)_2$ solution to obtain 1.5 wt % MgO on the carrier. After impregnation the magnesium nitrate is decomposed at 350° C.
Impregnation of the modified carrier with a nickel metal precursor:
The carrier is impregnated by incipient wetness with a nickel citrate solution as described in example III. After impregnation the nickel citrate is decomposed at 450° C.

Example XIX

Carrier: A carrier as described in example I is used.
Impregnation of the carrier with an alkaline earth metal: The carrier is impregnated by incipient wetness with a $Mg(NO_3)_2$ solution to obtain 4.5 wt % MgO on the carrier. After impregnation the magnesium nitrate is decomposed at 350° C.
Impregnation of the modified carrier with a nickel metal precursor:
The carrier is impregnated by incipient wetness with a nickel citrate solution as described in example III. After impregnation the nickel citrate is decomposed at 450° C.

The metal-profile of the catalyst tablets has been examined by the applicant by scanning electron microscopy analysis (SEM) using standardless Energy Dispersive X-ray spectroscopy (EDS)-analysis for chemical analysis. Prior to analysis the catalysts were reduced in hydrogen and pasivated in clean air ($O_2/N_2$ mix with low $O_2$ content) at room temperature. Ni, Rh based catalysts were reduced at 525° C. and Ru-based catalysts at 350° C. The samples were cleaved into half tablet, which were embedded in epoxy and polished to obtain a flat surface. The embedded samples were re-embedded; ground and polished (with water present). To prevent charging during the SEM analysis, the samples were coated with carbon. The obtained profiles are displayed in FIGS. 1-4. The profile type and shell thickness are summarized in Table 1 and 2. The shell thickness is calculated as the distance from the outer surface of the catalyst body to the position where the metal concentration is 150% of the average metal concentration, as calculated as the average concentration from 800 μm and to the centre of the catalyst body.

The metal concentration in the shell is calculated as the average of the measured metal concentrations in the shell.

The maximum metal concentration in the shell is the highest metal concentration measured in the shell, which is typically very close to the outer surface.

Hammock—shell in table 1 means that there is a shell formation but the metal concentration does not decrease to zero or substantially zero (or below the minimum measurement threshold 0.5 wt %) in the centre.

For the Ru-containing samples wavelength dispersive X-ray spectroscopy (WDS) was used to determine the Ru concentration profiles. With this method Ru standards are used to enable an accurate determination of the Ru concentration which is lower. Hence, WDS has a lower detection limit than EDS.

TABLE 1

Metal profile type and concentration of metal in the catalyst body

| Example | Carrier | Precursor | Profile type/thickness μm | Metal Concentration in shell wt % | Maximum metal concentration in shell wt % |
|---|---|---|---|---|---|
| I | $MgAl_2O_4$/CaO | Ni-nitrate | shell - 742 | 4 | 5 |
| II | $MgAl_2O_4$/CaO | Ni-acetate | shell - 176 | 1 | 1.5 |
| III | $MgAl_2O_4$/CaO | Ni-citrate | shell - 155 | 4 | 7 |
| IV | $MgAl_2O_4$/MgO | Ni-citrate | shell - 46 | 7 | 8 |
| V | $MgAl_2O_4$/MgO | Ni-EDTA | Hammock Shell-376 | 3 | 4 |

TABLE 1-continued

Metal profile type and concentration of metal in the catalyst body

| Example | Carrier | Precursor | Profile type/thickness μm | Metal Concentration in shell wt % | Maximum metal concentration in shell wt % |
|---|---|---|---|---|---|
| VI | CaAluminate/CaO | Ni-citrate | shell - 447 | 4 | 6 |
| VII | CaAluminate/MgO | Ni-citrate | hammock shell-103 | 8 | 11 |
| VIII | MgAl$_2$O$_4$/MgO | Ni-EDA | hammock shell - 90 | 2 | 2.2 |
| IX | MgAl$_2$O$_4$/MgO | Ru(NO)(NO$_3$)$_3$ | shell-90 | 2 | 2.6 |
| X | MgAl$_2$O$_4$/MgO | Rh-nitrate | shell-200 | 2 | 3.9 |

TABLE 2

Comparative example: Metal profile type and concentration of metal in the catalyst body

| Example | Carrier | Precursor | Profile type/thickness | Metal Concentration wt % |
|---|---|---|---|---|
| XI | MgAl$_2$O$_4$ | Ni-acetate | homogeneous | 3 |
| XII | MgAl$_2$O$_4$ | Ni-citrate | homogeneous | 4-11 |
| XIII | MgAl$_2$O$_4$ | Ni-nitrate | Homogeneous | 8 |
| XIV | CaAluminate | Ni-citrate | Homogeneous | 12 |
| XV | MgAl$_2$O$_4$ | Ru(NO)(NO$_3$)$_3$ | homogeneous | 1 |

Figure 1:
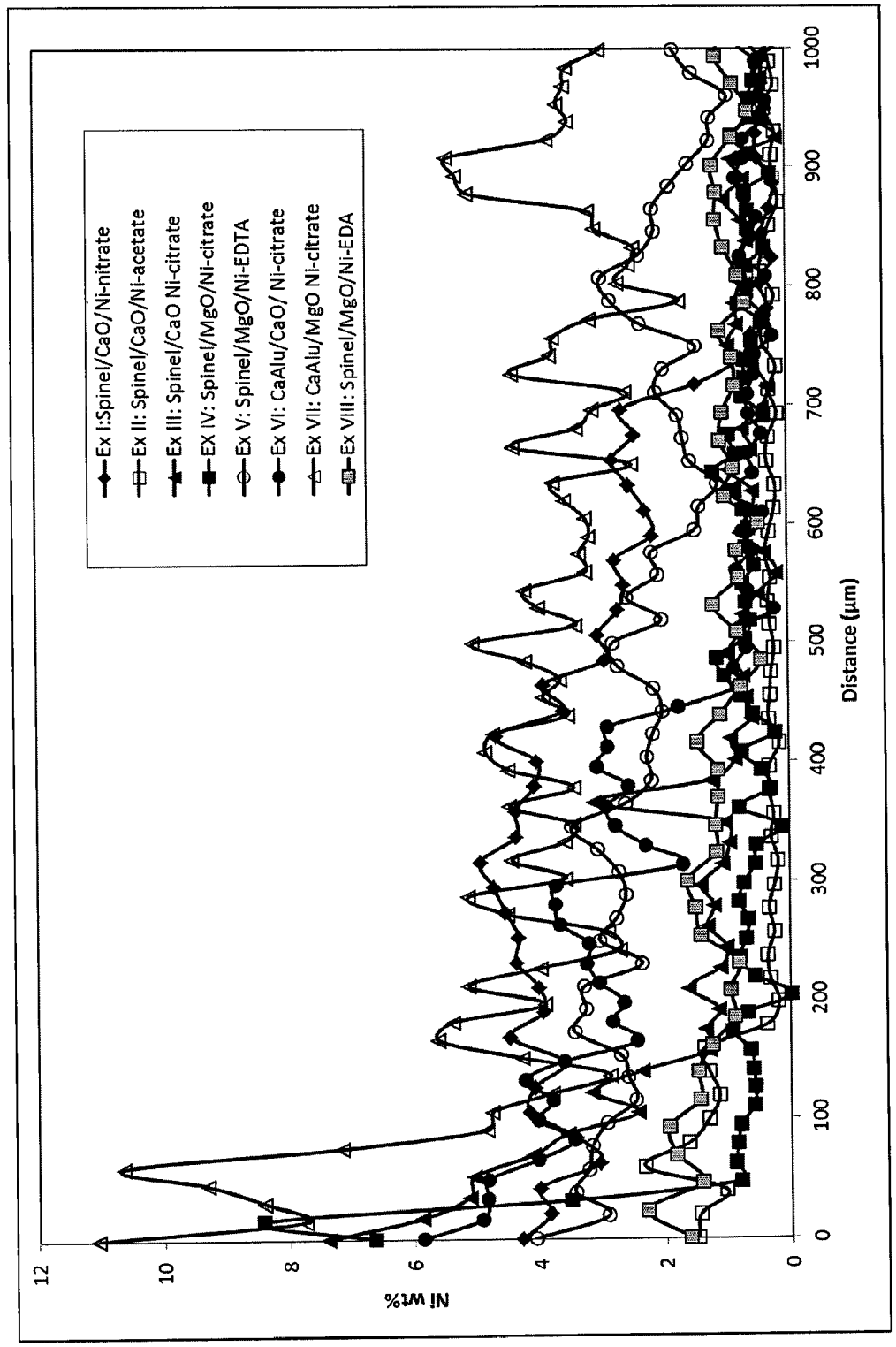
FIG. 1. Nickel concentration profiles measured by EDS analysis along the cross-section of the catalyst body for examples I-VIII. The line scans were measured from the outer surface of the catalyst body and inwards. There is an uncertainty of +/−30 μm on the measured position. 1000 μm has been used as the center for these plots and related table values.
Figure 2:
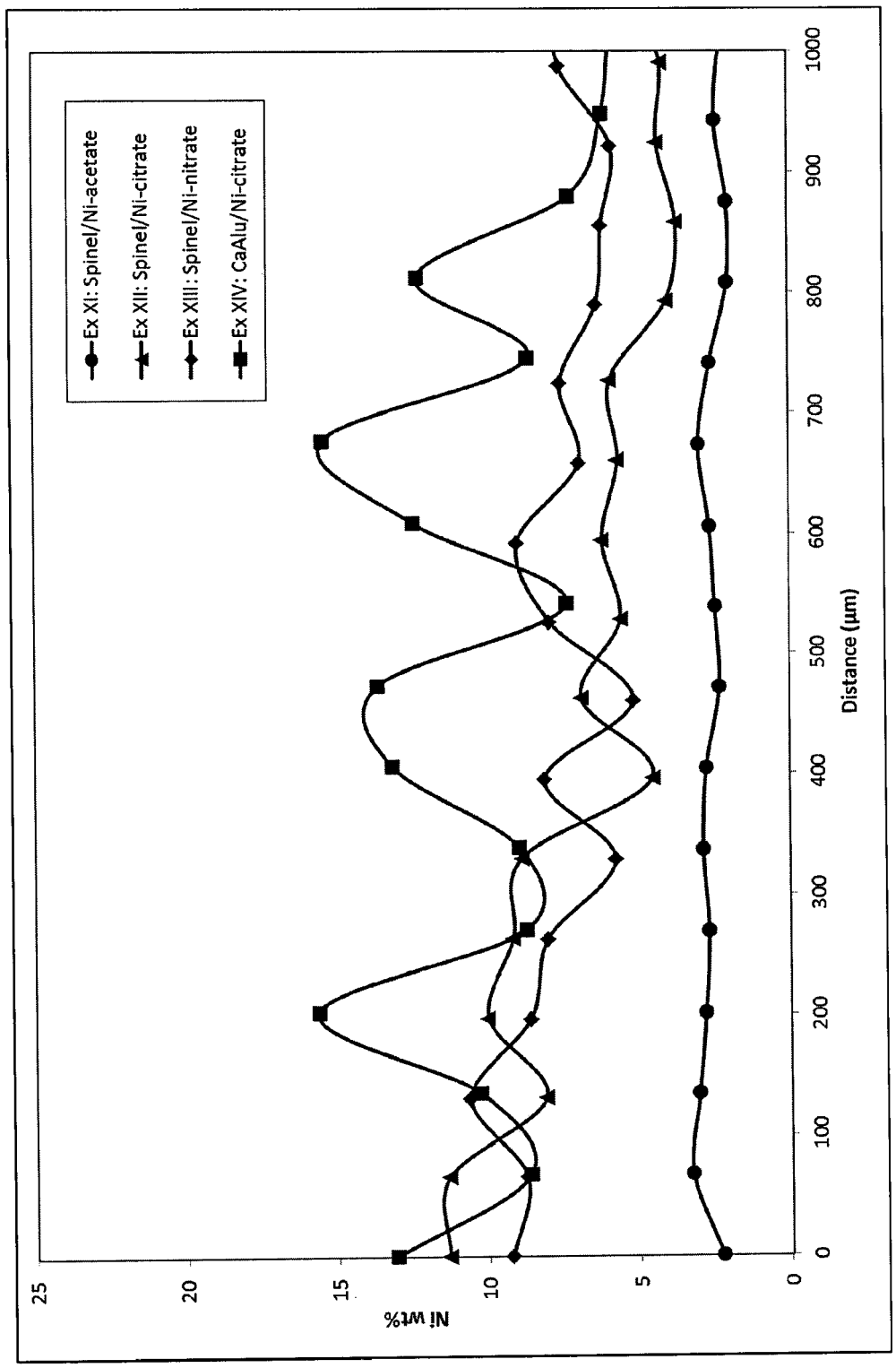
FIG. 2. Nickel concentration profiles measured by EDS analysis along the cross-section of the catalyst body for examples XI-XIV. The line scans were measured from the outer surface of the catalyst body and inwards. There is an uncertainty of +/−100 μm on the measured position.
Figure 3:
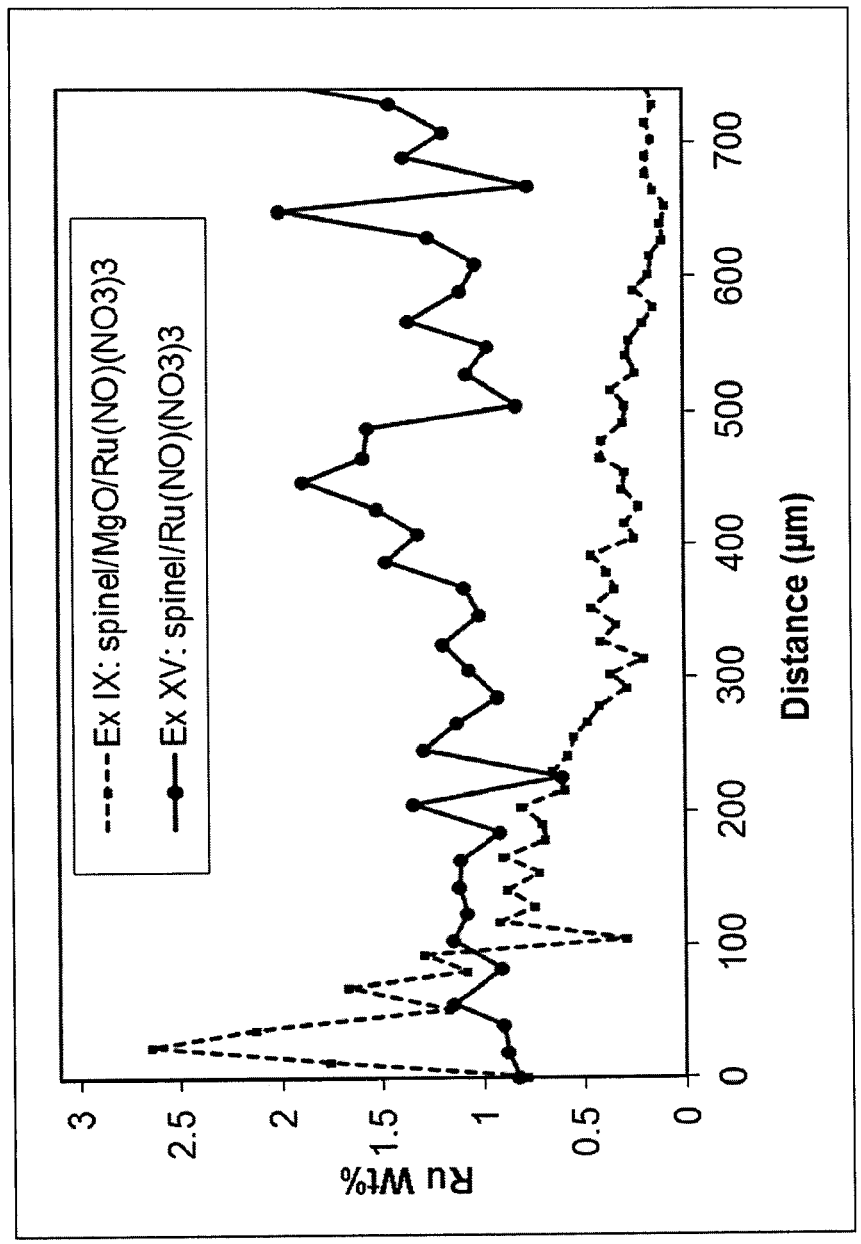
FIG. 3. Ruthenium concentration profiles measured by wavelength dispersive X-ray spectroscopy (WDS) analysis along the cross-section of the catalyst body for examples IX and XV. The line scans were measured from the outer surface of the catalyst body inwards.
Figure 4:
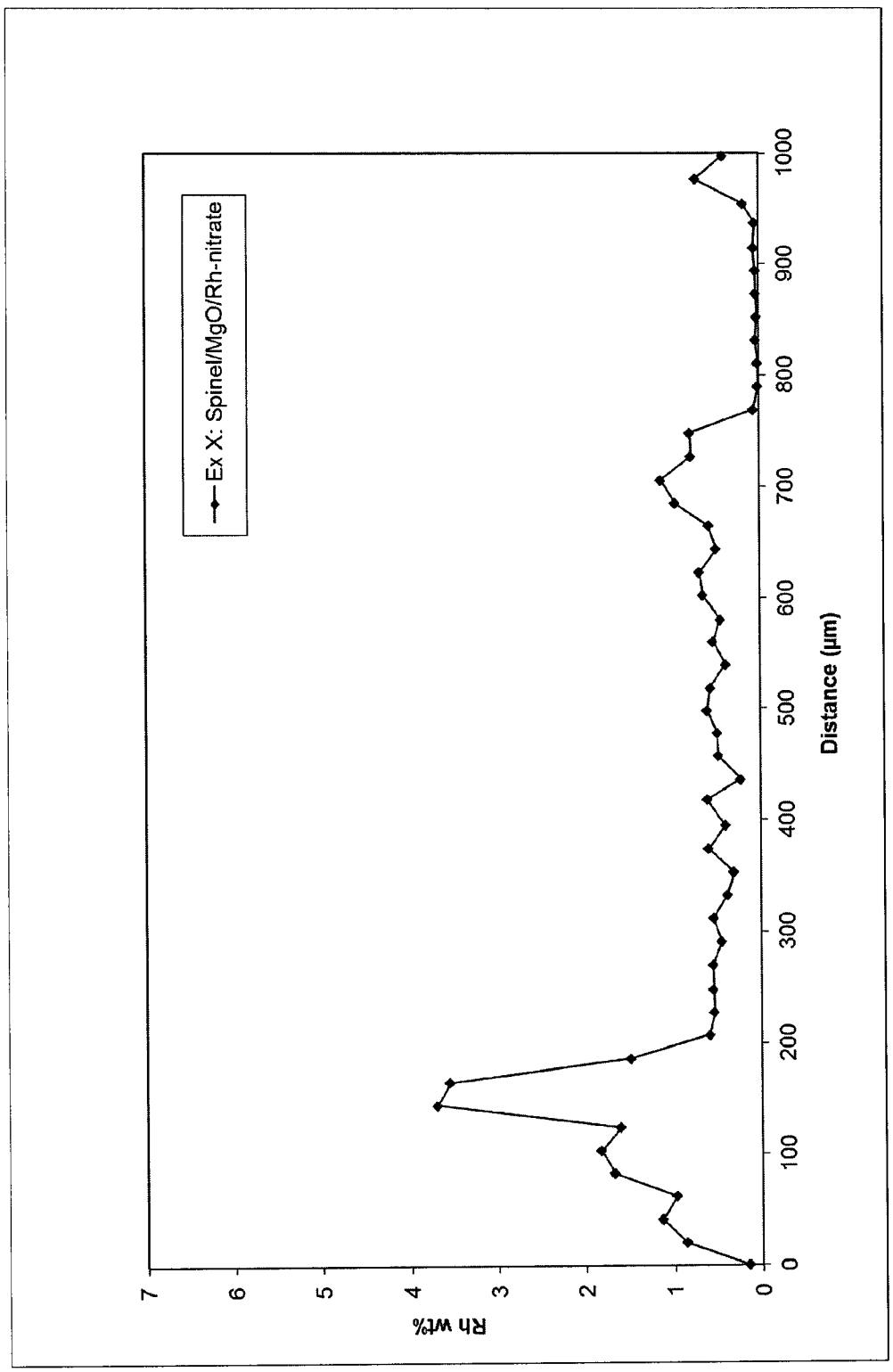
FIG. 4. Rhodium concentration profiles measured by EDS analysis along the cross-section of the catalyst body for example X. The line scans were measured from the outer surface of the catalyst body and inwards.
Figure 5:
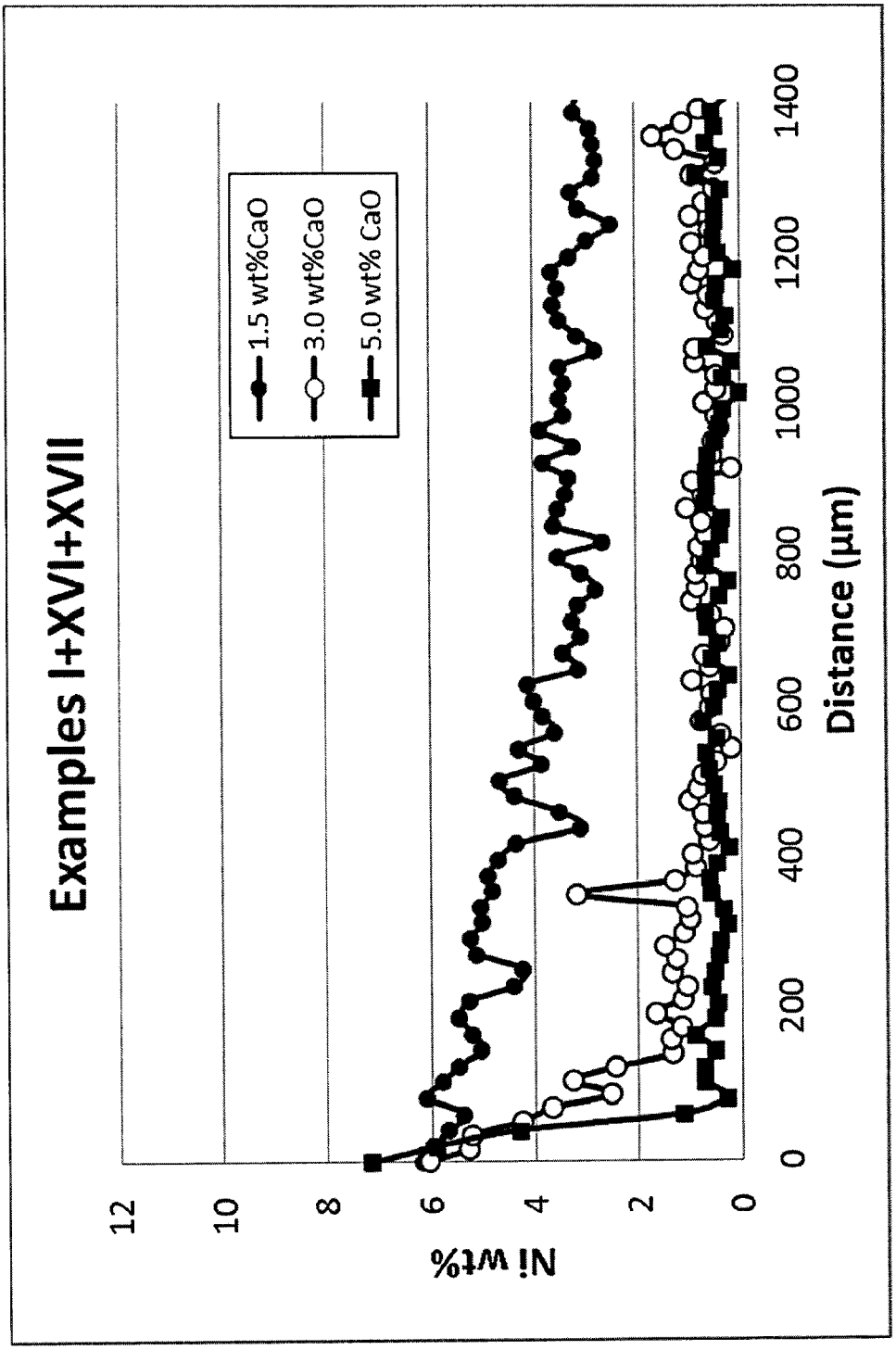
FIG. 5. Nickel concentration profiles measured by EDS analysis along the cross-section of the catalyst body for examples I-XVI-XVII. The line scans were measured from the outer surface of the catalyst body inwards. 1.5 wt % CaO results in an increased Ni concentration in the shell region and a clear and sharp shell formation at both 3 and 5 wt % CaO. It appears that 5 wt % results in a slightly sharper shell than 3 wt %.
Figure 6:
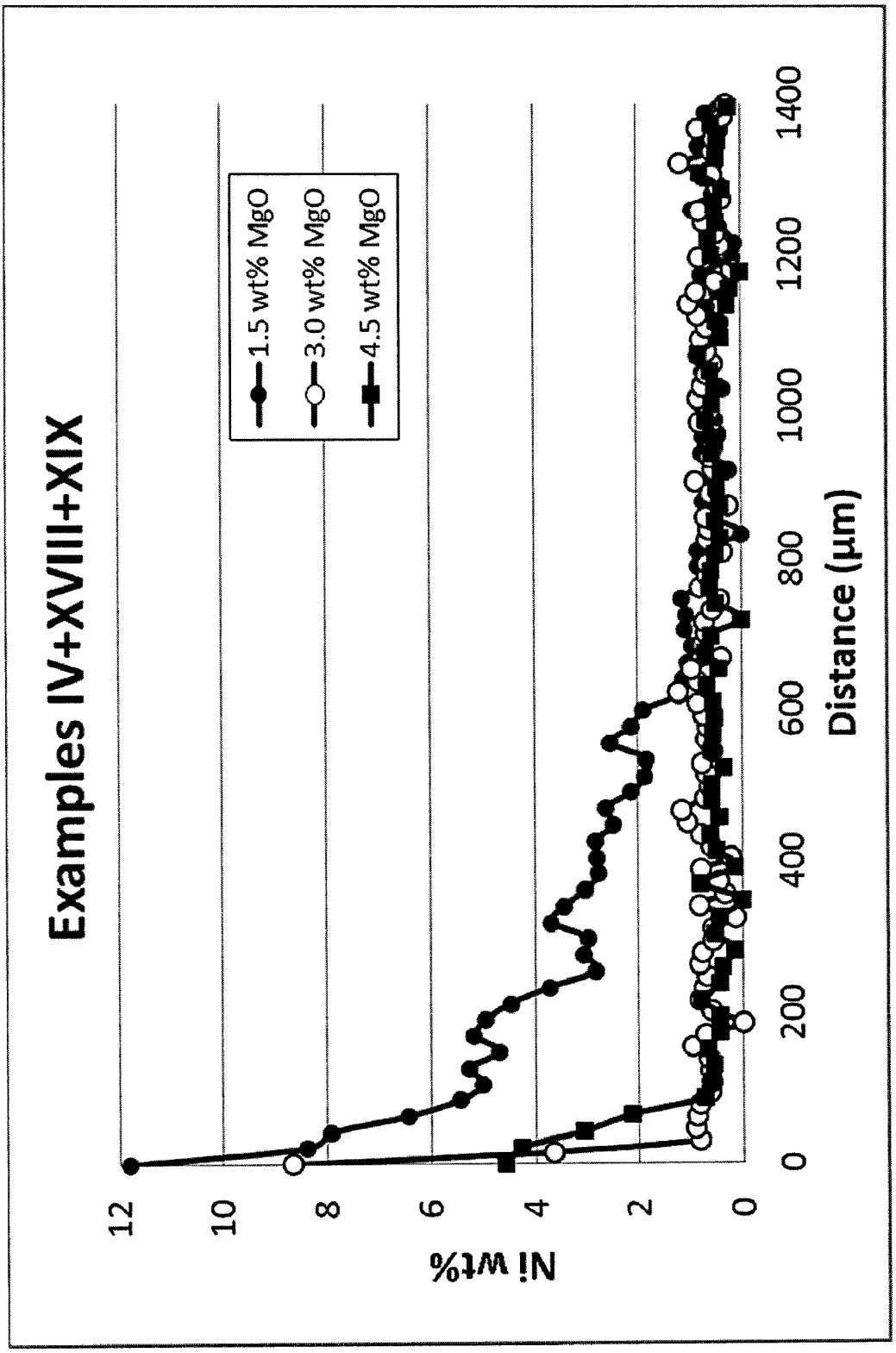
FIG. 6. Nickel concentration profiles measured by EDS analysis along the cross-section of the catalyst body for examples IV-XVIII-XIX. The line scans were measured from the outer surface of the catalyst body inwards. 1.5 wt % MgO results in a clear shell region and a clear and sharp shell formation is also registered at both 3 and 4.5 wt % MgO. It appears that 3 wt % results in a slightly sharper shell than 5 wt %.
Figure 7:
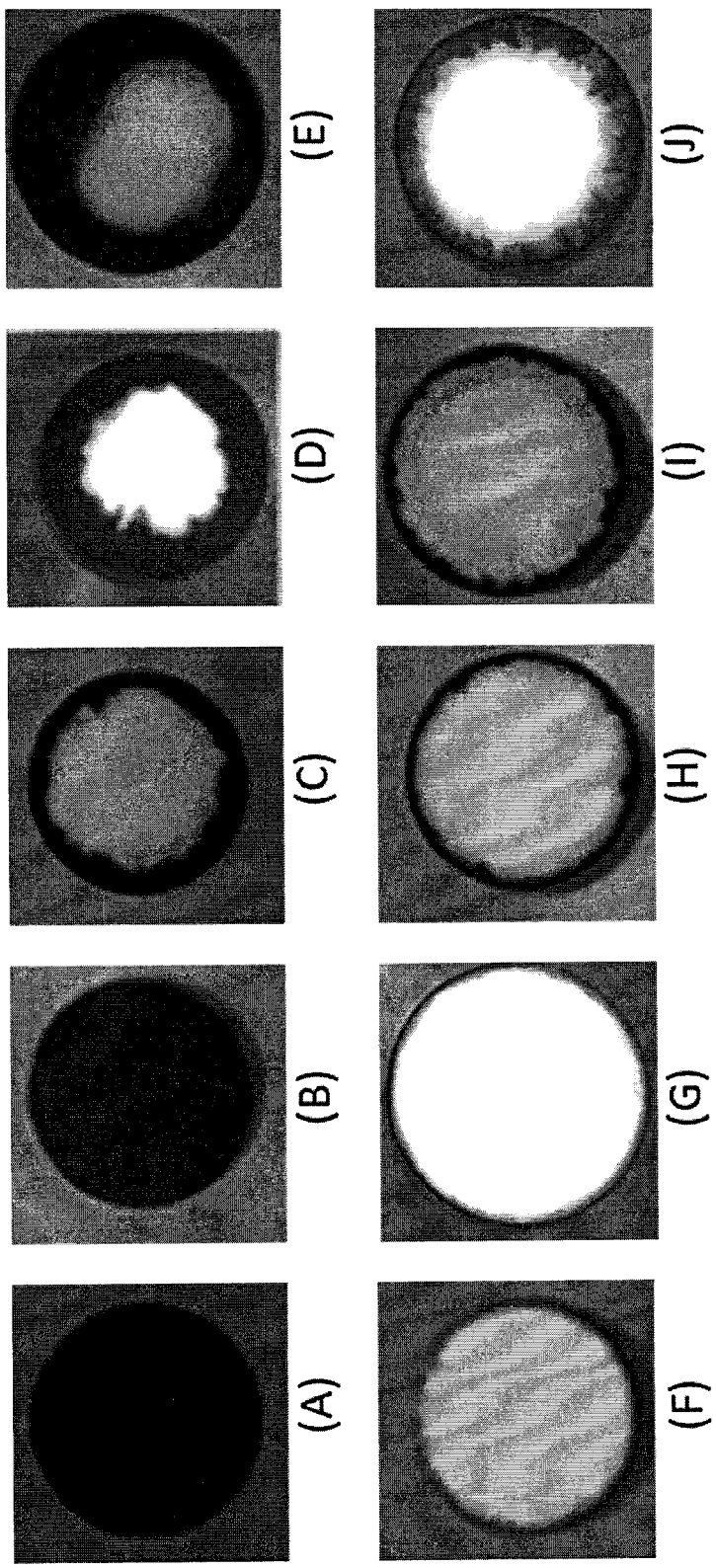
FIG. 7. Optical images of 4 mm impregnated cylinders cut in the middle through the cross-section. The images reveal the areas containing nickel (grey or black) and the areas not containing nickel (white). For these examples, the same spinel and Ca-aluminate carriers were used as starting point as described in examples I and VI but shaped (pressed) into 4 mm cylinders. The cylinders where first pre-modified with different amounts of either CaO or MgO, as described in examples I and IV, and subsequently impregnated with either Ni nitrate, Ni acetate or Ni citrate solutions, as described in examples I, II and III. The details on the carrier, wt % of the pre-modifier and the nickel precursor used are described in the following.

(A) Magnesium alumina spinel carrier without pre-modifier impregnated with Ni nitrate sol.
(B) Calcium aluminate carrier without pre-modifier impregnated with Ni nitrate sol.
(C) Magnesium alumina spinel carrier pre-modified with 4.5 wt % MgO and impregnated with Ni nitrate sol.
(D) Calcium aluminate carrier pre-modified with 4.5 wt % MgO and impregnated with Ni nitrate sol.
(E) Calcium aluminate carrier pre-modified with 1.5 wt % MgO and impregnated with Ni acetate sol.
(F) Magnesium alumina spinel carrier pre-modified with 3.0 wt % CaO and impregnated with Ni citrate sol.
(G) Magnesium alumina spinel carrier pre-modified with 4.5 wt % MgO and impregnated with Ni citrate sol.
(H) Magnesium alumina spinel carrier pre-modified with 4.5 wt % MgO and impregnated with Ni acetate sol.
(I) Magnesium alumina spinel carrier pre-modified with 5.0 wt % CaO and impregnated with Ni acetate sol.
(J) Calcium aluminate carrier pre-modified with 4.5 wt % MgO and impregnated with Ni acetate sol.

The invention claimed is:
1. A process for producing a catalyst body, said process comprising the steps of:
 providing a carrier comprising magnesium alumina spinel and/or Calcium aluminates, wherein the carrier has a pore volume 200-400 ml/kg and a BET surface area 2-50 m²/g,
 modifying said carrier by a first impregnation with at least one alkaline earth metal in a first metal precursor solution, wherein the alkaline earth metal is selected from the group consisting of Mg, Ca, and Ba,
 decomposing the first metal precursor at a temperature of from 300-900° C. to form an alkaline earth metal oxide or alkaline earth metal hydroxide layer on the carrier, thereby obtaining a modified carrier, carrying out a second impregnation by a second precursor solution comprising at least one metal Me in a second solution, the metal Me comprising a catalytic metal, wherein the second precursor solution is Me-nitrate, Me-citrate, Me-Ethylenediaminetetraacetic acid (EDTA), or Me-Ethylenediamine (EDA) and decomposing the second precursor to metal oxide, thereby obtaining a catalyst body having an enrichment of the at least one catalytic metal Me in an outer shell of the catalyst body, said at least one catalytic metal Me being present in a concentration having either an egg-shell profile and/or a hammock profile.

2. A process according to claim 1, wherein the first precursor solution is a nitrate, carbonate or hydroxide of the alkaline earth metals.

3. A process according to claim 1, wherein the first decomposition is carried out at 350-550° C.

4. A process according to claim 1, wherein the alkaline earth metal concentration in the carrier is 0.5-10 wt %, after impregnation.

5. A process according to claim 1, wherein the catalytic metal Me is Ni, Ru, Rh, Ir, Pd and/or Pt.

6. A process according to claim 1, wherein the catalytic metal Me is Ni, Ru and/or Rh.

7. A process according to claim 1, wherein the impregnated carrier is dried between the second impregnation and the second decomposition.

8. A process according to claim 1, wherein the second decomposition is carried out at 350-600° C.

9. A process according to claim 1, wherein the alkaline earth metal oxide/hydroxide concentration is 1-6 wt % of the carrier.

10. A process according to claim 1, wherein 90% of the catalytic metal Me present within an outer later having a thickness of up to 500 μm.

11. A process according to claim 1, wherein the second impregnation is carried out by incipient wetness.

12. A process according to claim 1, wherein the obtained catalyst body comprises a core section and the outer shell, wherein the core comprises carrier material impregnated with the alkali earth metal oxide or alkali earth metal hydroxide, wherein the outer shell comprises the carrier material impregnated with the alkali earth metal oxide or alkali earth metal hydroxide and the catalytic metal Me.

13. A process according to claim 1, wherein the catalytic metal Me is Ni.

14. A process for producing a catalyst body, said process comprising the steps of:

providing a carrier comprising magnesium alumina spinel and/or Calcium aluminates, wherein the carrier has a pore volume 200-400 ml/kg and a BET surface area 2-50 m²/g, modifying said carrier by a first impregnation with at least one alkaline earth metal in a first metal precursor solution, decomposing the first metal precursor at a temperature of from 300-700° C. to form an alkaline earth metal oxide or alkaline earth metal hydroxide layer on the carrier, thereby obtaining a modified carrier, carrying out a second impregnation by a second precursor solution comprising at least one metal Me in a second solution, the metal Me comprising a catalytic metal, wherein the second precursor solution is Me-nitrate, Me-citrate, Me-Ethylenediaminetetraacetic acid EDTA), or Me-Ethylenediamine (EDA), and decomposing the second precursor to metal oxide, thereby obtaining a catalyst body having an enrichment of the at least one catalytic metal Me in an outer shell of the catalyst body, said at least one catalytic metal Me being present in a concentration having either an egg-shell profile and/or a hammock profile.

15. A process according to claim 14, wherein the alkaline earth metal is selected from the group consisting of Mg, Ca and Ba.

16. A process according to claim 14, wherein the catalytic metal Me is Ni, Ru and/or Rh.

17. A process according to claim 14, wherein the second decomposition is carried out at 350-600° C.

18. A process according to claim 14, wherein 90% of the catalytic metal Me present within an outer later having a thickness of up to 500 μm.

19. A process according to claim 14, wherein the second impregnation is carried out by incipient wetness.

20. A process according to claim 14, wherein the obtained catalyst body comprises a core section and the outer shell, wherein the core comprises carrier material impregnated with the alkali earth metal oxide or alkali earth metal hydroxide, wherein the outer shell comprises the carrier material impregnated with the alkali earth metal oxide or alkali earth metal hydroxide and the catalytic metal Me.

21. A process according to claim 14, wherein the catalytic metal Me is Ni.

* * * * *